United States Patent [19]
Shank

[11] Patent Number: 4,902,094
[45] Date of Patent: Feb. 20, 1990

[54] HYBRID PLUG ASSEMBLY

[75] Inventor: Jeffrey B. Shank, Williamsport, Pa.

[73] Assignee: GTE Products Corporation, Stamford, Conn.

[21] Appl. No.: 233,388

[22] Filed: Aug. 18, 1988

[51] Int. Cl.<sup>4</sup> .............................................. G02B 6/38
[52] U.S. Cl. .............................. 350/96.21; 350/96.20
[58] Field of Search ................. 350/96.20, 96.21, 96.22

[56] References Cited
U.S. PATENT DOCUMENTS
4,714,317 12/1987 Szentesi .............................. 350/96.21
4,721,357 1/1988 Kovalchick et al. ........ 350/96.21 X Primary Examiner—John D. Lee
Assistant Examiner—Phan T. Heartney
Attorney, Agent, or Firm—William H. McNeill

[57] ABSTRACT

A hybrid plug assembly including a first connector and a concentric second connector for use in precision interfacing two different types of fiber optic connectors within a tubular adapter containing an alignment sleeve.

19 Claims, 3 Drawing Sheets

HYBRID PLUG ASSEMBLY

BACKGROUND OF THE INVENTION

1. Field of the Invention

The present invention relates to a hybrid plug assembly for interfacing two different fiber optic connectors. The assembly enhances intermateability of such connectors in the field, laboratory, and central office during testing and emergency routing of cables without the need for special order hybrid jumper cables or hybrid adapters.

2. Description of the Prior Art

The absence of uniform standards for fiber optic connectors has resulted in each manufacturer establishing their own designs to obtain precision alignment of optical fibers. As a result there are presently a great variety of connectors. The existence of such variety has necessitated the use of hybrid jumper cables. A hybrid jumper cable is a length of fiber optic cable having customer specified connectors terminated on each end of the cable. Obviously, the greater the number of different customers, the greater will be the number of different connectors required. However, the use of custom hybrid jumper cables is an added expense. In addition, there is a loss of power in a given system due to the increased number of connection points caused by the use of such hybrid equipment. Hybrid adapters are also presently in use. However, as in the case regarding the hybrid jumper cables, there is a need for a number of different configurations to accommodate the different connector designs in use. Further, it is often difficult to mount a hybrid adapter to existing equipment. For example, the mounting holes for connectors in existing equipment are not always comparible with the configuration of the hybrid adapter. In addition, typically each connector has its own bulkhead adapter which in many instances is not dimensionally interchangeable. Further, mounting holes are often positioned on the permanent back panel of existing equipment rendering access difficult, if at all possible, for modification.

It is highly desirable to provide a hybrid plug assembly for interfacing fiber optic connectors without added expense and with minimum loss of power in a given system.

It is further desirable to provide a hybrid plug assembly for interfacing fiber optic connectors of varying configuration.

It is also desirable to provide a hybrid plug assembly for interfacing fiber optic connectors without the need for jumper cables.

It is further desirable to provide a hybrid plug assembly for interfacing fiber optic connectors without the need for a variety of hybrid adapters.

It is desirable to provide a hybrid plug assembly for interfacing fiber optic connectors which can be readily mounted to existing equipment.

SUMMARY OF THE INVENTION

The invention achieves these and other results by providing a hybrid plug, comprising a first coupling comprising a cylindrical portion at one end and a conical portion at an opposite end. The cylindrical portion includes an outer surface having at least one flat area. The cylindrical portion defines a first cylindrical cavity at the one end and the conical portion defines a second cylindrical cavity at the opposite end. The second cylindrical cavity is of smaller diameter than the first cylindrical cavity. A conical cavity extends within the first coupling, the conical cavity being tapered from the first cylindrical cavity to the second cylindrical cavity. A second coupling is provided comprising an externally threaded cylindrical member having an internal cylindrical surface defining a cylindrical chamber extending from a first end of the threaded cylindrical member to an opposite second end of the threaded cylindrical member. The internal cylindrical surface includes at least one flat region. The first coupling extends through the cylindrical chamber such that the flat region of the second coupling is keyed to the flat area of the first coupling. The conical portion extends from the opposite second end and the first cylindrical portion extends from the first end. The first cylindrical cavity, second cylindrical cavity, conical cavity, and first cylindrical chamber are concentric.

DESCRIPTION OF THE PREFERRED EMBODIMENTS

Figure 1:
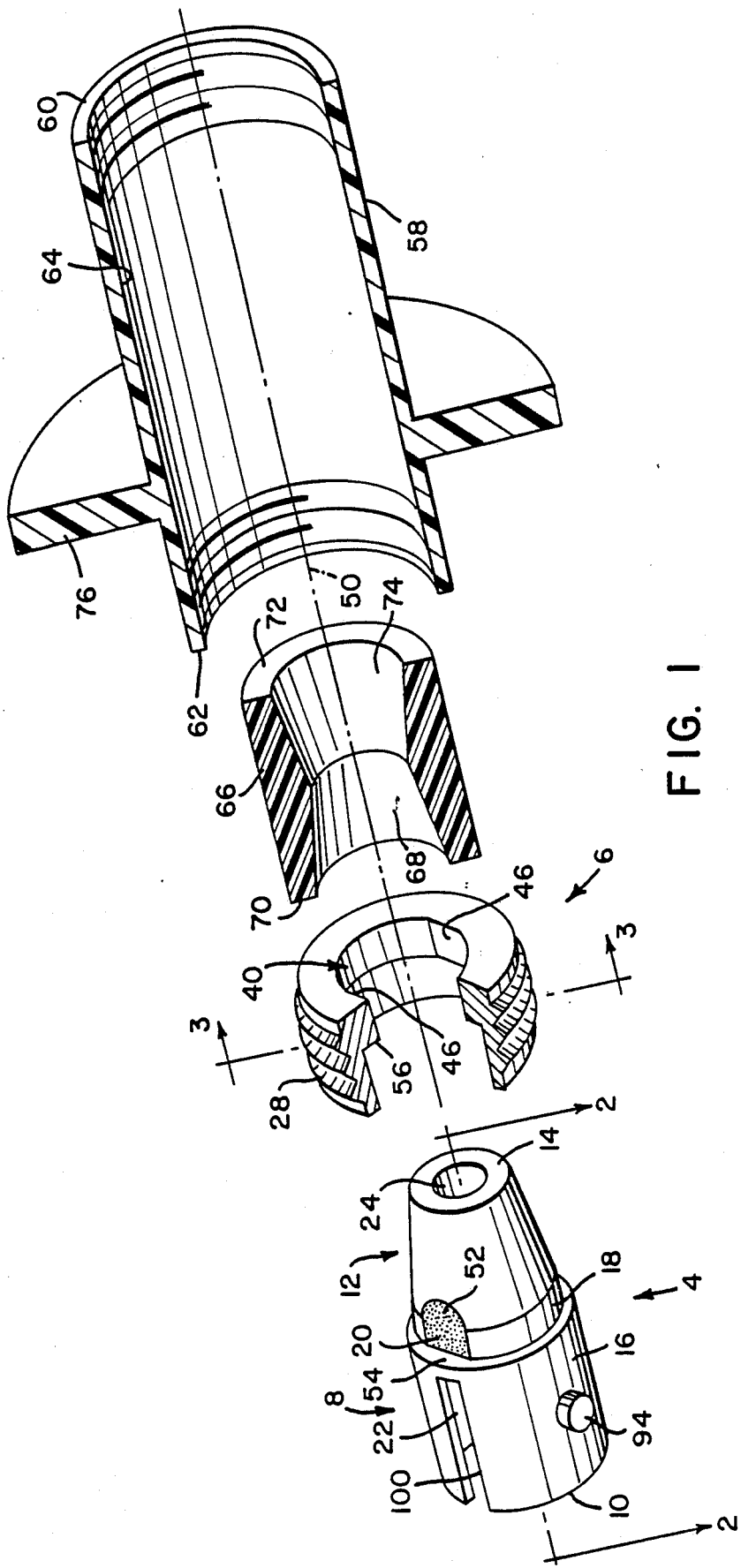
FIG. 1 is an exploded perspective view of one embodiment of the hybrid plug assembly of the present invention.
Figure 4:
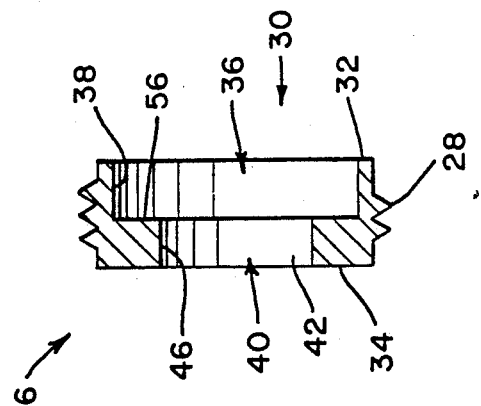
FIG. 4 is a sectional view taken along 4—4 of FIG. 3.
Figure 3:
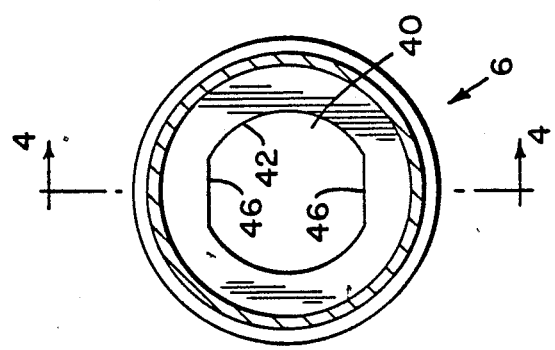
FIG. 3 is a sectional view taken along 3—3 of FIG. 1.
Figure 2:
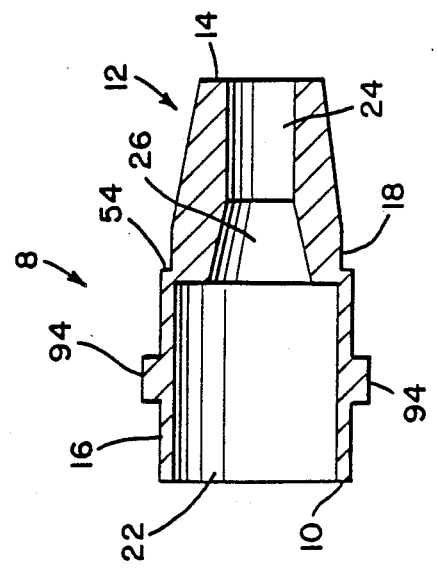
FIG. 2 is a sectional view taken along 2—2 of FIG. 1.

The embodiment of this invention which is illustrated in the drawings is particularly suited for achieving the objects of this invention. The drawings depict a hybrid plug assembly comprising a first coupling 4 and a second coupling 6. First coupling 4 comprises a cylindrical portion 8 at one end 10 and a conical portion 12 at an opposite end 14. In the preferred embodiment the cylindrical portion 8 includes a first cylindrical outer wall 16 and a second cylindrical outer wall 18, the diameter of the second cylindrical outer wall 18 being less than the diameter of the first cylindrical outer wall 16. The second cylindrical outer wall 18 is located between the conical portion 12 and the firt cylindrical outer wall 16. The cylindrical portion 8 includes an outer surface having at least one flat area. For example, as depicted in FIG. 1, the second cylindrical outer wall 18 includes at least one flat area 20. In the preferred embodiment the first coupling 4 includes at least two flat areas 20 separated by 180°. Although only one flat area 20 is depicted in FIG. 1, an identical flat area 20 exists 180° about the periphery of the second cylindrical outer wall 18. Cylindrical portion 8 comprises first cylindrical cavity 22 at end 10 and conical portion 12 comprises a second cylindrical cavity 24 at the opposite end 14. Cavity 24 has a smaller diameter than cavity 22. Cylindrical portion 8 also comprises a conical cavity 26 which as depicted in FIG. 2 extends within the first coupling 4 tapering from cavity 22 to cavity 24. The first coupling 4 can be constructed of a plastic compound, powdered metals or machined from metal or alloys.

The second coupling 6 of the hybrid plug assembly comprises a cylindrical member externally threaded at 28 and having an internal cylindrical surface defining a cylindrical chamber 30 extending from a first end 32 of the threaded cylindrical member to an opposite second end 34. Preferably, the cylindrical chamber 30 includes a first cylindrical section 36 at first end 32 defined by a first section 38 of the internal cylindrical surface and a second cylindrical section 40 at opposite end 34 defined by a second section 42 of the internal cylindrical surface. Second section 40 is of smaller diameter than first section 36. The internal cylindrical surface of the second coupling 6 includes at least one flat region. In the preferred embodiment each flat region is included at the second section 42 of the internal cylindrical surface. For example, in the embodiment depicted in the drawings there are two such flat regions 46 separated by 180°. The second coupling 6 can be constructed of a plastic compound or metal as desired.

Figure 5:
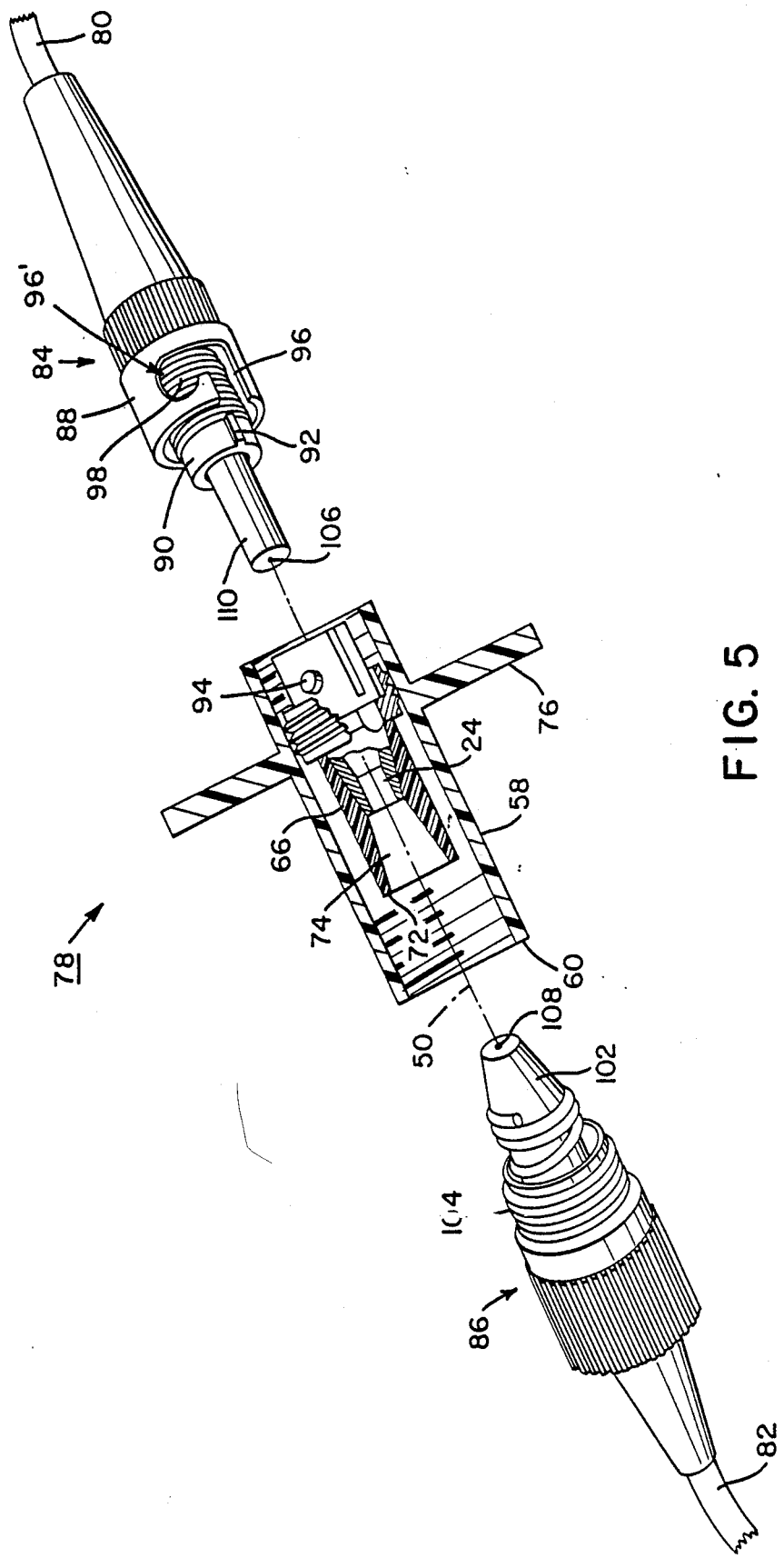
FIG. 5 is an exploded perspective view of one embodiment of the hybrid plug assembly of the present invention in use with a pair of different type connectors.

As depicted in FIGS. 1 and 5 the first coupling 4 extends through the cylindrical chamber 30 of the second coupling 6 such that the flat areas 20 are keyed to respective flat regions 46. In other words, as the first coupling 4 is inserted into the second coupling 6, the flat areas 20 engage the flat regions 46 thereby guiding and properly aligning the first coupling relative to the second coupling. Preferably, the first coupling 4 is affixed to the second coupling 6 by means of an adhesive or epoxy 52 at the interface of respective flat areas 20 and flat regions 46. The exact bonding component is dependent upon the materials from which the first and second couplings are made. As can be seen in FIG. 5, when assembled the conical portion 12 of the first coupling 4 extends from end 34 of the second coupling 6, and the cylindrical portion 8 extends from end 32. First cylindrical cavity 22, second cylindrical cavity 24, conical cavity 26, and cylindrical chamber 30 are concentric relative to axis 50.

In the preferred embodiment, the first coupling 4 of the hybrid plug assembly includes a first radially extending flange 54 at the juncture of an extending between the first cylindrical outer wall 16 and the second cylindrical outer wall 18. In a like manner, the second coupling 6 of the hybrid plug assembly includes a second radially extending flange 56 at the juncture of and extending between the first section 38 and the second section 42. As depicted in FIGS. 1 and 5, flange 54 abuts flange 56.

In its fully operative condition, the hybrid plug assembly includes a tubular adapter 58 open at both ends 60 and 62 and having an internal cylindrical wall 64. The second coupling 6 is threaded into the tubular adapter 58 by means of threads 28, into the internal threads of cylindrical wall 64. The tubular adapter 58 can be constructed of a rigid plastic material. The assembly further includes an alignment sleeve 66 positioned within the tubular adapter 58, the alignment sleeve including at least one conical opening 68 tapered from one end 70 towards an opposite end 72. Preferably, the alignment sleeve 66 includes two opposing conical openings 68 and 74 each tapered from a respective end 70, 72 towards a respective opposite end 72, 70 of the alignment sleeve. As depicted in FIG. 5, the conical portion 12 of the first coupling 4 extends into conical opening 68. The tubular adapter 66 and conical openings 68 and 74 are concentric with the first cylindrical cavity 22, second cylindrical cavity 24, conical cavity 26 and cylindrical cavity 30, relative to axis 50. The alignment sleeve 66 can also be constructed of a rigid plastic material. The tubular adapter 58 includes a mounting flange 76.

When in use, the hybrid plug assembly facilitates interfacing, as generally depicted at 78 in FIG. 5, of fiber optical cables 80 and 82 each of which include a connector 84 and 86, respectively, of a type known in the art. Connector 84 includes a bayonet coupling nut 88 and a ferrule housing 90 including a key tab 92. In order to lock the connector 84 onto the hybrid plug assembly at least one tab 94 is provided protruding from the first cylindrical outer wall 16. In the preferred embodiment two tabs 94 are provided, such tabs being separated by 180°. In particular, as the connector 84 is caused to extend into the hybrid plug assembly, a tab 94 enters opening 96 as spring 98 is depressed, the subsequent turning of connector 84 about its axis 50 causing such tab 94 to be positioned in opening 96' to lock the connector in plce in a known manner. Tabs 94 also serve to thread the first coupling 4 and second coupling 6 into the tubular adapter 58 by locking such tabs into a keyed tool (not shown) useful in such insertion. In order to guide the key tab 92 into the hybrid plug assembly and insure repeatable attenuation of the mating termini, the first cylindrical outer wall 16 includes a slot 100 which extends from end 10 of the first coupling 4 towards opposite end 14. When connector 84 is caused to extend into the hybrid plug assembly, the key tab 92 is guided by the slot 100.

Cable 80 is interfaced with cable 82 by also inserting the protruding conical portion 102 of connector 86 into the conical opening 74 of the alignment sleeve 66 as connector 86 is threaded into the tubular adapter 58 by means of threads 104. When the connectors 84 and 86 have been fully extended into the hybrid plug assembly the optical fibers 16 and 108 will be in proper alignment.

In using the hybrid plug assembly as described herein the alignment sleeve 66 allows for the alignment of the tapers of the conical portion 12 of the first coupling 4 and the conical portion 102 of the connetor 86. The cylindrical portion 8 of the first coupling 4 provides the means for the alignment of the optical axis when different connectors 84, 86 are connected. The cavity 24 allows for alignment of the ferrule 110 within the first coupling 4. Proper alignment is effected as a result of the concentricity of the conical portion 12 relative to the diameter of the cavity 24. This relationship achieves the required alignment when connectors 84 and 86 are mated within the tubular adapter 58.

The hybrid plug assembly of the present invention allows for precision alignment when two different fiber optic connectors are to be mated. Intermateability in the field, laboratory or central office is enhanced in all applications including, for example, testing and emergency routing of cables, all being done without the need for special jumper cables or adapters. Costs are reduced and equipment mismatch is eliminated. Fiber optic interfacing is effected with minimum loss of power in the system and without the necessity for equipment modification.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A hybrid plug assembly comprising:
a first coupling comprising a cylindrical portion at one end and a conical portion at an opposite end, said cylindrical portion including an outer surface having at least one flat area, said cylindrical portion comprising a first cylindrical cavity at said one end, said conical portion comprising a second cylindrical cavity at said opposite end, said second cylindrical cavity being of smaller diameter than said first cylindrical cavity, and a conical cavity extending within said first coupling, said conical cavity tapering from said first cylindrical cavity to said second cylindrical cavity; and, a second coupling comprising an externally threaded cylindrical member having an internal cylindrical surface defining a cylindrical chamber extending from a first end of said threaded cylindrical member to an opposite second end of said threaded cylindrical member and including at least one flat region, said first coupling extending through said cylindrical chamber such that said at least one flat area is keyed to said at least one flat region, said conical portion extends from said opposite second end, said cylindrical portion extends from said first end, and said first cylindrical cavity, said second cylindrical cavity, said conical cavity and said cylindrical chamber are concentric.

2. The hybrid plug assembly of claim 1 wherein said cylindrical portion of said first coupling includes a first cylindrical outer wall and a second cylindrical outer wall, the diameter of said second cylindrical outer wall being less than the diameter of said first cylindrical outer wall, said second cylindrical wall being located between said conical portion and said first cylindrical outer wall and including said outer surface having said at least one flat area, and wherein said cylindrical chamber defined by said internal cylindrical surface includes a first cylindrical section at said first end of said threaded cylindrical member defined by a first section of said internal cylindrical surface, and a second cylindrical section at said opposite second end of said threaded cylindrical member defined by a second section of said internal cylindrical surface, said second cylindrical section being of smaller diameter than said first cylindrical section and including said at least one flat region.

3. The hybrid plug assembly of claim 2 further including a first radially extending flange at the juncture of and extending between said first cylindrical outer wall and said second cylindrical outer wall, and a second radially extending flange at the juncture of and extending between said first section of said internal cylindrical surface and said second section of said internal cylindrical surface, said first radially extening flange abutting said second radially extending flange.

4. The hybrid plug assembly of claim 3 further including at least one tab protruding from said first cylindrical outer wall.

5. The hybrid plug assembly of claim 4 wherein said first cylindrical outer wall includes a slot extending from said one end of said first coupling towards said opposite end of said first coupling.

6. The hybrid plug assembly of claim 5 wherein said at least one flat area includes two flat areas separted by 180° and wherein said at least one flat region includes two flat regions separated by 180°.

7. The hybrid plug assembly of claim 6 including a tubular adapter open at both ends thereof and having an internal cylindrical wall, said externally threaded cylindrical member being threaded into said tubular adapter, and further including an alignment sleeve positioned within said tubular adapter, said alignment sleeve including at least one conical opening tapered from one end of said alignment sleeve towards an opposite end of said alignment sleeve, said conical portion of said first coupling extending into said at least one conical opening, and said tubular adapter and said at least one conical opening being concentric with said first cylindrical cavity, said second cylindrical cavity, said conical cavity, and said cylindrical chamber.

8. The hybrid plug assembly of claim 7 wherein said first coupling is coupled to said second couping by means of an adhesive at an interface of respective of said two flat areas and said two flat regions.

9. The hybrid plug assembly of claim 2 further including at least one tab protruding from said first cylindrical outer wall.

10. The hybrid plug assembly of claim 9 wherein said first cylindrical outer wall includes a slot extending from said one end of said first coupling towards said opposite end of said first coupling.

11. The hybrid plug assembly of claim 10 including a tubular adapter open at both ends thereof and having an internal cylindrical wall, said externally threaded cylindrical member being threaded into said tubular adapter, and further including an alignment sleeve positioned within said tubular adapter, said alignment sleeve including at least one conical opening tapered from one end of said alignment sleeve towards an opposite end of said alignment sleeve, said conical portion of said first coupling extending into said at least one conical opening, and said tubular adapter and said at least one conical opening being concentric with said first cylindrical cavity, said second cylindrical cavity, said conical cavity, and said cylindrical chamber.

12. The hybrid plug assembly of claim 11 wherein threads of said externally threaded cylindrical member thread into said threaded internal cylindrical wall.

13. The hybrid plug assembly of claim 12 wherein said at least one conical opening includes two opposing conical openings each tapered from a respective end of said alignment sleeve towards a respective opposite end of said alignment sleeve.

14. The hybrid plug assembly of claim 10 wherein said at least one flat area includes two flat areas separated by 180° and wherein said at least one flat region includes two flat regions separated by 180°.

15. The hybrid plug assembly of claim 14 wherein said at least one tab includes two tabs protruding from said first cylindrical outer wall, said two tabs being separated by 180°.

16. The hybrid plug assembly of claim 15 wherein said first coupling is coupled to said second coupling by means of an adhesive at an interface of respective of said two flat areas and said two flat regions.

17. The hybrid plug assembly of claim 1 including a tubular adapter open at both ends thereof and having an internal cylindrical wall, said externaly threaded cylindrical member being threaded into said tubular adapter, and further including an alignment sleeve positioned within said tubular adapter, said alignment sleeve including at least one conical opening tapered from one end of said alignment sleeve towards an opposite end of said alignment sleeve, said conical portion of said first coupling extending into said at least one conical opening, and said tubular adapter and said at least one conical opening being concentric with said first cylindrical cavity, said second cylindrical cavity, said conical cavity, and said cylindrical cavity.

18. The hybrid plug assembly of claim 17 wherein threads of said externally thraded cylindrical member thread into said internally threaded cylindrical wall.

19. The hybrid plug assembly of claim 18 wherein said at least one conical opening includes two opposing conical openings each tapered from a respective end of said alignment sleeve towards a respective opposite end of said alignment sleeve.

* * * * *